3,198,873
FLEXIBLE CONDUITS HAVING ELECTRICAL CONDUCTORS THEREIN
Rodney F. Ryan, Lancaster, Pa., and Richard G. Walsh, Indianapolis, Ind., assignors to Atlas Corporation, New York, N.Y., a corporation of Delaware
Filed May 20, 1963, Ser. No. 281,727
1 Claim. (Cl. 174—47)

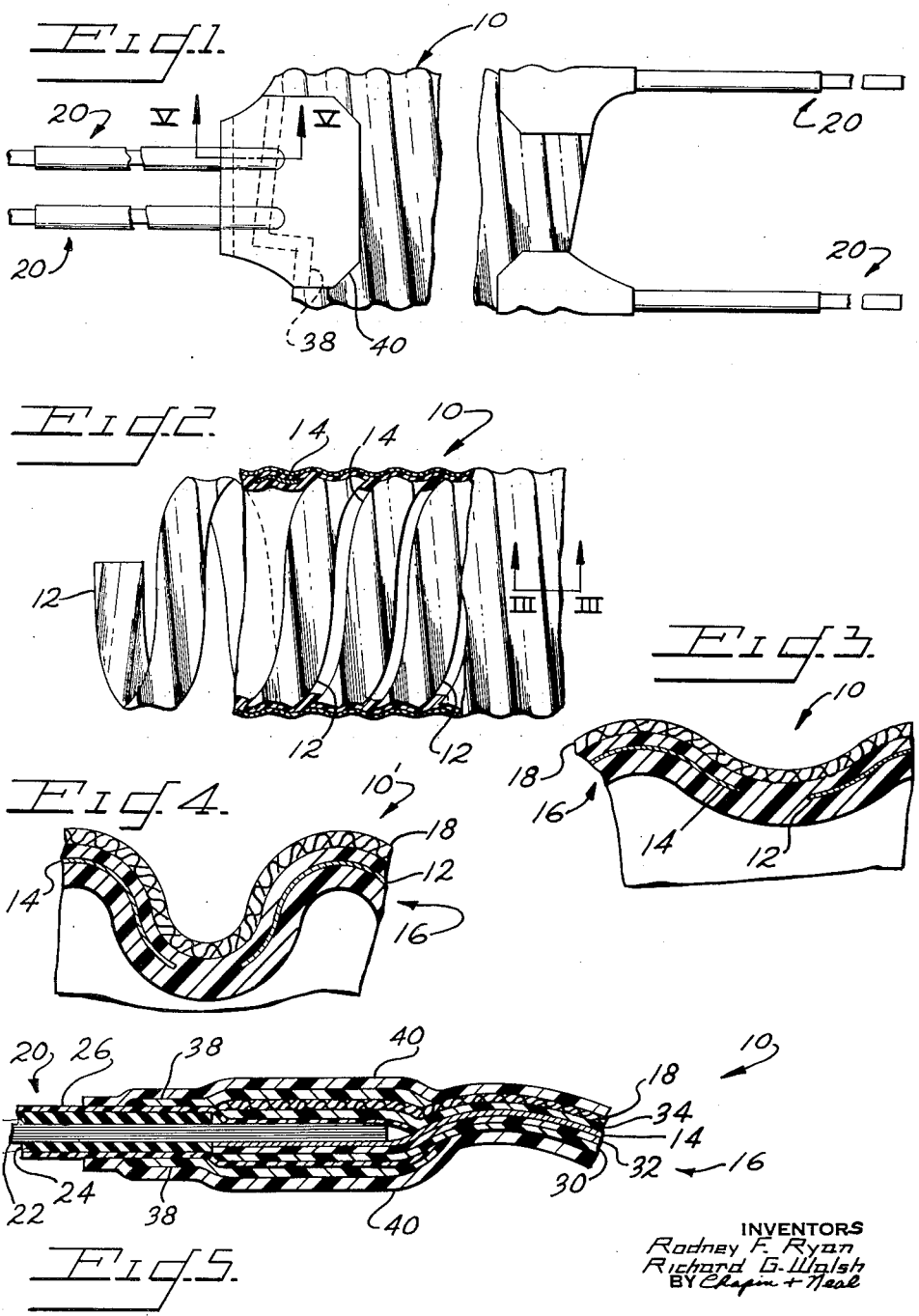

The present invention relates to improvements in flexible conduit of the type having electrical conductors therein.

The object of the invention is to provide flexible conduit of the type above referred to, having more uniform electrical characteristics throughout its length, and in a more specific sense having an electrically conductive element present substantially along any axial line along the inner surface of the conduit.

Another object of the invention is to provide an improved flexible conduit providing means for completing a circuit therethrough.

A further object of the invention is to provide a flexible conduit of improved flexibility where an electrical conductor strip is encapsulated therein.

The objects of the invention are attained by a corrugated flexible conduit having encapsulated therein one or more relatively thin and wide conductor strips which are helically wound along the length of the hose. The conductor strips are corrugated in the same fashion as the conduit and adjacent coils of the conductor strips are closely spaced apart. In this fashion the conductor strip or strips are present substantially throughout the length of any line running axially along the inner surface of the conduit. This provides a conductive surface which would detect a failure at substantially any point along the length of the conduit. Also, it provides a conductive surface which may provide a uniform heat throughout the length of the conduit where a current is impressed across the conductive strip.

The above and other relates objects and features of the invention will be apparent from a reading of the following description of the disclosure found in the accompanying drawings and the novelty thereof set forth in the appended claim.

In the drawings:

FIG. 1 illustrates a length of conduit with portions broken away formed in accordance with the present invention;

FIG. 2 is a view showing portions of the conduit progressively broken away;

FIG. 3 is a section taken on line III—III in FIG. 2;

FIG. 4 is a section similar to that of FIG. 3 showing a conduit of greater flexibility; and FIG. 5 is a section taken on line V—V in FIG. 1.

FIGS. 1 and 2 illustrate a length of conduit 10 embodying the present invention. Two metal conductor strips 12 and 14 are encapsulated within the wall of the conduit and are helically wound along its length to provide an electrically conductive surface substantially throughout the length of the hose along any axial line which would be disposed immediately beneath its inner surface.

The conduit (FIG. 3) comprises a plastic wall 16 having an outer covering 18 of plastic impregnated fiberglass cloth. In each instance the plastic material is preferably polytetrafluoroethylene (hereinafter PTFE, available from E. I. du Pont de Nemours & Co.) to obtain efficient operation under high temperature and/or pressure operating conditions, and also to obtain low friction characteristics. The metal strips 12 and 14 are preferably ductile and for purposes later described, are advantageously nickel-plated copper strips.

It will be noted that the strips 12 and 14 are corrugated in an axial direction to the same extent as the conduit itself, so as to have little or no effect on the flexibility of the conduit. FIG. 4 illustrates a slightly modified conduit 10' having deeper corrugations and greater flexibility.

Although the hose is initially formed as a lamination of several strips of PTFE material (as later explained), it is preferable that these strips be fused into the integral wall 16 with PTFE material completely encapsulating the strips 12 and 14 and providing an insulation between the closely spaced, adjacent coils of these strips.

The conduit of the present invention may be made by following the teachings of U.S. Patent No. 3,023,787 wherein it is disclosed that a plurality of strips of fusible plastic material may be helically wound to form a plastic tube which is then corrugated to give extreme flexibility to the conduit thus formed. The conduit of the present invention is formed in essentially the same fashion with the exception that two relatively thin and relatively wide metal strips are also wound along with the plastic material in such fashion that they are disposed intermediate the strips of plastic material. The outer layer is formed by the winding of a plstic impregnated fiberglass strip. This tubular laminate is fused to encapsulate the metal strips within the hose. The corrugating means disclosed in said patent are sufficient to corrugate the metal strips within the hose to essentially the same extent as the plastic material itself.

The conduit shown in the drawings is intended primarily as a liner for metal conduits which carry electrical cable for vital aircraft control systems. By connecting detection means to the strips 12 and 14, it is possible to sense a failure in the insulation of such cables before a spark might be produced which would result in an explosion or fire. Due to the fact that conductive elements are provided substantially throughout the length of any axial line along the inner surface of the conduit 10, it is possible to obtain maximum assurance of detecting such failures.

The connection of the failure detecting means to the strips 12, 14 is made through leads 20. A pair of leads 20 is connected to each end of each of the strips 12 and 14, as will be seen in FIG. 1. One of the pair of leads 20 is shown in section by FIG. 5, it being understood that the pair shown in the left end of FIG. 1 are both connected to a single strip as the strip 14 and an identical pair of leads 20 (not shown) is located at the opposite or rear side of the conduit wall for similar connection to strip 12. Each pair of leads in encapsulated within a laminate of plastic material in order to insure proper transmission of a sensing signal.

Reference will now be made particularly to FIG. 5 for a description of the connection of one of the leads 20 to the strip 14 and the form of the encapsulation which is employed. The lead 20 comprises an electrical conductor 22 encased within insulation 24. This insulation is entubed at its inner end within a PTFE sleeve 26. The conductor at its inner end extends beyond the insulation 24 and is soldered or otherwise electrically connected to the strip 14.

At this point note will be taken of the fact that the encapsulation of the leads 20 results in an integral fusing of the PTFE material forming the encapsulation with the PTFE material of the conduit itself. However, in FIG. 5 the various layers of material are shown separately as are also the layers of material which are employed in forming the conduit. Thus it will be seen that wall 16 of the conduit preferably comprises two layers (actually the wound strips referred to above) 30 and 32 underlying the metal strips 12 and 14. The strips 30 and 32 are carried to the end of the conduit and underlie the metal strip 14, as shown. The sleeve 26 is split with the lower portion underlying the strips 30 and 32 and the upper portion laid against the conductor 22. The wall 16 of the conduit further comprises a PTFE layer 34 and the PTFE impregnated fiberglass outer cover 18, previously referred to, both of which overlie the upper portion of the sleeve 26.

The material of the encapsulation comprises a sheet 38 of PTFE material preferably impregnated with aluminum powder. This sheet passes over the leads 20 and is folded on itself to embrace the inner and outer marginal end portions of the conduit. Further comprising the encapsulation is a second sheet 40 of PTFE material which also passes over the leads 20 and is folded against the sheet 38 and also embraces the inner and outer surfaces of the conduit. After assembly the encapsulations are fused so that the components thereof are integrally joined and connected to the conduit.

The provision of the two conductive strips 12 and 14 enables current to be conveyed in two directions through the conduit or it provides an additional safeguard in the case of the failure of one detection circuit, the same as the provision of a pair of leads as described above for each strip obviates the possibility of the failure of one lead.

It will also be apparent that a single conductive strip may be employed in many instances with great advantage and that its coils would be closely spaced apart.

It will likewise be apparent that the strips 12 and 14 need not necessarily be used in a sensing system but could also be used, with a proper selection of material, as resistance elements which would be employed to provide a highly uniform heating means for conveying materials which would solidify or become overly viscous at ambient temperatures.

Having thus described the invention, what is claimed as novel and desired to be secured by Letters Patent of the United States is:

An electrically conductive flexible hose conduit having a thin plastic wall and embedded therein a relatively wide thin metal conductor strip wound along the length of the conduit with side edges being closely spaced between adjacent windings and providing an embedded construction with a conductive surface adjacent substantially the entire inner wall area of the conduit, said composite wall being corrugated circumferentially of the conduit and at the ends thereof having leads extending from said strip, the portion of the plastic wall overlying each end of said metal strip at the ends of the conduit being raised and the inner end of a lead being disposed in contact with the strip, a plastic sleeve encasing each lead and being split at its inner end section with one sleeve portion underlying the edge of the conduit wall and the other sleeve portion overlying said lead and strip connection, and plastic sheet members folded over the conduit wall surfaces in the area of said connections and adjacent lead portions, the plastic material of said sleeve and sheet elements of each lead connection being integrally fused with the wall material of the conduit and forming an encapsulation incorporated therewith as a localized extension of the end wall of the conduit.

References Cited by the Examiner

UNITED STATES PATENTS

| 646,887 | 4/00 | Stowe et al. | 138—127 |
| 1,746,701 | 2/30 | Kimmich | 138—121 |
| 2,524,522 | 10/50 | Gilmore et al. | 138—133 X |
| 3,023,787 | 3/62 | Phillips et al. | 138—121 |
| 3,115,898 | 12/63 | Rothermel | 138—122 |

FOREIGN PATENTS 488,914    7/38    Great Britain.

LARAMIE E. ASKIN, *Primary Examiner.*
JOHN P. WILDMAN, DARRELL L. CLAY,
*Examiners.*